UNITED STATES PATENT OFFICE.

MACEY F. DEMING, OF TAPPAN, NEW YORK.

PROCESS FOR PREPARING FOOD FOR INFANTS, INVALIDS, AND OLD PERSONS.

1,108,555.  Specification of Letters Patent.  Patented Aug. 25, 1914.

No Drawing.   Application filed June 19, 1913.   Serial No. 774,582.

*To all whom it may concern:*

Be it known that I, MACEY F. DEMING, a citizen of the United States, residing at Tappan, in the county of Rockland and State of New York, have invented new and useful Improvements in Processes for Preparing Food for Infants, Invalids, and Old Persons, of which the following is a specification.

My invention relates to a process for preparing from edible proteins, edible fats and edible carbohydrates, singly or in natural or artificial combination, and cereals, foods in which the quantities and kinds of protein, fats and carbohydrates may be varied, and the object of my invention is to provide a process by which a wide variety of scientific foods for infants, invalids and old persons—the term scientific foods meaning foods of whatever composition and containing whatever kinds of proteins, fats, and carbohydrates are deemed indicated by the dietitian, physician or nurse in charge of the person to be fed—may be prepared from cereals and edible proteins, edible fats and edible carbohydrates and the food pasteurized in one operation by a person not skilled in scientific work.

To the accomplishment of the above recited object and others of a similar nature my invention consists in the combination of the elements set forth in and falling within the scope of the appended claims. And it should be understood that I do not confine myself to all the precise details set forth, as there may be modification and variation in certain respects without departing from the spirit of my invention or exceeding the scope of my claims.

I attain this object by the use of comminuted or milled cereals, diastatic enzyms, water or milk, or water and milk, not to exceed 170° F. but preferably under 100° F., and any edible protein, edible fat or edible carbohydrate, or any natural or artificial combination of all or any two of them deemed suitable for each person to be fed.

In my process a diastatic enzym in suitable quantity is dissolved in water or milk, or water and milk, below 170° F. and any desired quantities of comminuted cereal, and edible protein, edible fat or edible carbohydrate, or any natural or artificial combination of all or any two of them, are added to the water or milk, or water and milk, and thoroughly mixed. The mixture is then heated until it suddenly becomes flocculent, that is at about 170° F., at which time the heat is removed. The comminuted cereals at this point are thoroughly cooked, the starch they contained, with the exception of a slight residue, is converted into dextrin and maltose, the activity of the diastatic enzym undestroyed, and the food at the same time is pasteurized, the appearance of flocculency indicating pasteurization. Sugar may be added if desirable and the food after being cooled is ready for use.

No special utensils are necessary, an ordinary saucepan or preferably the usual household double boiler being all that is required. The reasons for removing the heat when the food mixture becomes finely flocculent are that above the temperature at which this flocculence appears undesirable changes take place in the milk and the diastatic enzyms are destroyed.

In preparing cereals for infants, invalids and old persons it largely has been the practice to use whole or cracked or rolled grains, and to boil them with water for from three to six hours to break them up into fine particles by rupturing their cellular structure and the coats of the starch grains through the effect of the heat of boiling to enable the digestive juices to get at the starch, the cell walls of the cereals and the coats of the starch grains being only slightly affected by the digestive secretions of human beings. When the cereal grains are reduced to fine particles by milling which breaks up the cellular structure of the grain and are in the form of flours or comminuted, the water with which they are cooked can act upon every particle of the contents of the cells of the cereal and the cooking or rupturing of the coats of the starch grains is then accomplished in from five to fifteen minutes depending upon the intensity of the heat to which the cereal flour is subjected, the nearer to 212° F. the more rapid being the cooking or rupturing, but it is not necessary to heat the cereal flour above 170° F. with water to accomplish such cooking or rupturing in substantially fifteen minutes of time.

Dextrin and maltose are derived from starch by the action of diastatic enzyms upon the starch, the conditions most favorable for the conversion of starch into dextrin and maltose being when the starch is cooked in water with the diastatic enzym at temperature between 146° and 170° F. (temperatures of pasteurization).

Heretofore as representing the highest and most scientific state of the art of preparing food for infants, invalids and old persons from cereals and milk and cream as practised by physicians skilled in dietetics, it has been the practice to prepare a gruel by boiling in water whole, cracked or rolled cereals three to six hours, or cereal flours for fifteen minutes or longer, then to cool the gruel until it can be borne in the mouth, then to add the diastatic enzym to produce dextrin and maltose, and the desired proportion of milk and sugar, and then to heat this mixture to 150 to 170° F. for fifteen to thirty minutes to pasteurize. Thus such preparation of food involves the above mentioned separate processes requiring skill and the use of a thermometer and the knowledge of how properly to use the thermometer for purposes of pasteurization.

As pasteurization is accomplished between 150°–170° F., as thorough cooking of properly comminuted or milled cereals is possible at 150°–170° F., as dextrin and maltose are best prepared from gruels at temperatures of 150°–170° F. by the action of diastatic enzyms, as a change in the curding property of cow's milk occurs at 158°–170° F., that is, this temperature in addition to killing the bacteria in cow's milk alters its properties so that when it comes into contact with the digestive juices of the human stomach it forms a flaky curd, and as a suddenly appearing change of flocculency of the mixture of comminuted cereal, water, milk and diastatic enzyms takes place at about 170° F., (temperature of pasteurization) due to the comminuted cereals and the diastatic enzyms in the mixture and indicates that the mixture is cooked and also pasteurized, I thus by my process hereinbefore set forth combine the scientific making of gruel, dextrin and maltose and the pasteurization of the food in one operation and without the use of a thermometer.

In my process by comminuted cereals I mean any flour prepared from cereals, and I include as usable in my process any flour containing starch. In my process by milk I mean whole milk, skimmed milk, cream, top milk, whey, condensed milk, evaporated milk and dried milk.

As an illustration of how my process is used: Let it be desired to feed a person pasteurized liquid food containing 4% fat 2% protein, 7% carbohydrates, part of the protein to be derived from milk and part from a cereal and part of the carbohydrates to be dextrin and maltose. The necessary quantities of top milk or cream and comminuted cereal needed to furnish those percentages, a diastatic enzym and water would simply be mixed together and heated up to the point where the mixture became flocculent. In case the protein of milk disagreed with a person a feeding mixture of the same percentage composition could be made by using cream low in protein for furnishing the fat and the place of the milk protein might be filled by egg albumen or soy protein or by using various vegetable proteins. The process of preparing the food would be the same no matter what the source of the fat, protein and carbohydrates was.

In a case where milk of any kind or in any form is not tolerated a feeding mixture of the same percentage composition of protein, fat and carbohydrates can be prepared by my process by using instead of milk or cream the quantities of water, comminuted cereals and diastatic enzyms, and fat, protein and carbohydrates derived from other sources than milk needed to impart to the mixture the desired composition.

In case it is desired to omit or reduce the quantity of fat, protein or carbohydrate in a feeding mixture the material which would have furnished the objectionable element would be left out or reduced in quantity.

As a further use of my process, as the change in appearance or flocculency of a mixture of water, diastatic enzyms and comminuted cereals—the presence of milk not being necessary—in my process occurs when this mixture is heated to about 170° F., the temperature of pasteurization, and is sudden and clearly discernible to the person using my process, such mixture may be used in the absence of a thermometer as an indicator that the temperature of pasteurization has been reached in any liquid or mixture not containing comminuted cereals or their derivatives and diastatic enzyms that it is desirable to pasteurize. This is accomplished by placing in the vessel containing such liquid or mixture to be pasteurized a second suitable smaller vessel having in it a mixture of water, diastatic enzym and comminuted cereal and heating both the containing liquid or mixture and the contained mixture until the change in appearance or flocculency of the contained mixture is observed as indicating that the containing liquid or mixture has arrived at the temperature of pasteurization, about 170° F., or in other words is pasteurized.

Having fully described my process I claim:—

1. A process of preparing and pasteurizing food for infants, invalids and old persons consisting of heating a mixture comprising comminuted starch containing material, water, protein, fat, carbohydrate, and diastatic enzym to the point where the mixture becomes flocculent.

2. A process of preparing and pasteurizing food for infants, invalids and old persons consisting of heating a mixture comprising comminuted cereal, water, protein, fat, and diastatic enzym to the point where the mixture becomes flocculent.

3. A process of preparing and pasteurizing food for infants, invalids and old persons consisting of heating a mixture comprising comminuted cereal, water, protein, and diastatic enzym to the point where the mixture becomes flocculent.

4. A process of preparing and pasteurizing food for infants, invalids and old persons consisting of heating a mixture of comminuted cereal, water, and diastatic enzym to the point where the mixture becomes flocculent.

5. In a process of preparing and pasteurizing food for infants, invalids and old persons the heating of a mixture comprising comminuted starch containing material, water, and diastatic enzym to the point where the mixture becomes flocculent whereby the temperature of pasteurization of the mixture is indicated.

6. In a process of preparing and pasteurizing food for infants, invalids and old persons the heating of a mixture comprising comminuted cereal, water, protein, fat, carbohydrate, and diastatic enzym to the point where the mixture becomes flocculent whereby the temperature of pasteurization of the mixture is indicated.

Signed at the borough of Manhattan of the city of New York in the county and State of New York this 18th day of June, 1913.

MACEY F. DEMING.

Witnesses:
W. H. GEE,
D. ADAMS.